Jan. 26, 1943.  L. R. BUCKENDALE  2,309,162
AXLE CONSTRUCTION
Original Filed Nov. 23, 1936  2 Sheets-Sheet 1

Inventor
Lawrence R. Buckendale
Strauch & Hoffman
Attorneys

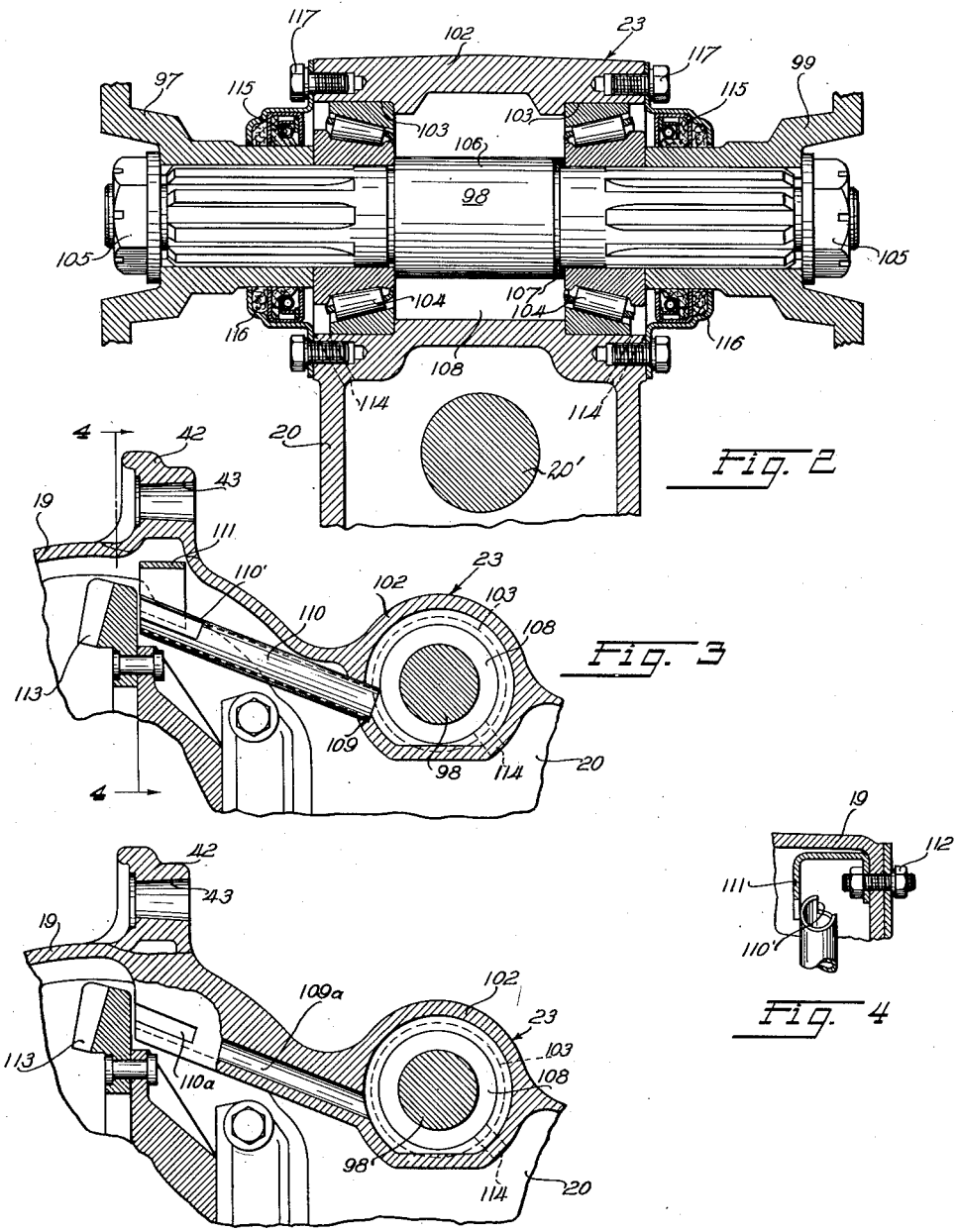

Patented Jan. 26, 1943

2,309,162

UNITED STATES PATENT OFFICE 2,309,162

AXLE CONSTRUCTION

Lawrence R. Buckendale, Detroit, Mich., assignor to The Timken-Detroit Axle Company, Detroit, Mich., a corporation of Ohio Original application November 23, 1936, Serial No. 112,413. Divided and this application February 10, 1939, Serial No. 255,773

11 Claims. (Cl. 180—22)

The present invention relates to novel axle constructions for use in multi-wheel tandem axle drive arrangements of the type disclosed in my United States Patent No. 2,168,970, issued August 8, 1939, of which the present application is a division, and is primarily concerned with improvements in the construction of forward axles for such tandem axle drives.

A primary object of this invention is to provide an improved axle construction, for use in tandem drive arrangements, which is easy to construct, dependable in operation and which not only has novel means for journalling a propeller shaft therein but also has novel means for supplying lubricant thereto.

A further object of this invention is to provide an improved drive arrangement for a tandem drive vehicle comprising two spaced axles, each having individual propeller shafts, wherein one of said axles is provided with novel bearing means for journalling the propeller shaft of the other and also has means for lubricating said bearing means.

Another object of this invention is to provide a novel lubrication system for a propeller shaft journal carried by the axle housing of a tandem vehicle drive, whereby the journal is lubricated with lubricant from the housing.

A still further object of this invention is to provide a novel propeller shaft journal carried by the forward axle of a dual rear axle drive unit.

Another object of this invention is to provide a journal for the rear axle propeller shaft as an integral part of the forward axle housing while utilizing the lubricant in the forward differential housing as the source of lubricant for said journal.

Further objects of the present invention will appear as the following description of a preferred embodiment thereof proceeds in connection with the appended claims and accompanying drawings, wherein:

Figure 2 is a transverse sectional view taken on line 2—2 of Figure 1 illustrating the novel propeller shaft journal provided on the forward drive axle.

Figure 3 is a longitudinal, fragmental, sectional view taken on line 3—3 of Figure 1 illustrating the novel lubricating system provided for lubricating the journal bearings of Figure 2.

Figure 4 is a fragmental sectional view taken on line 4—4 of Figure 3 showing the bracket for positioning the lubricant supply tube of Figure 3 and the manner in which it is connected to the housing of the forward drive axle.

Figure 5 is a sectional view of a modified form of lubricant supply system for the propeller shaft journal.

Figure 1:
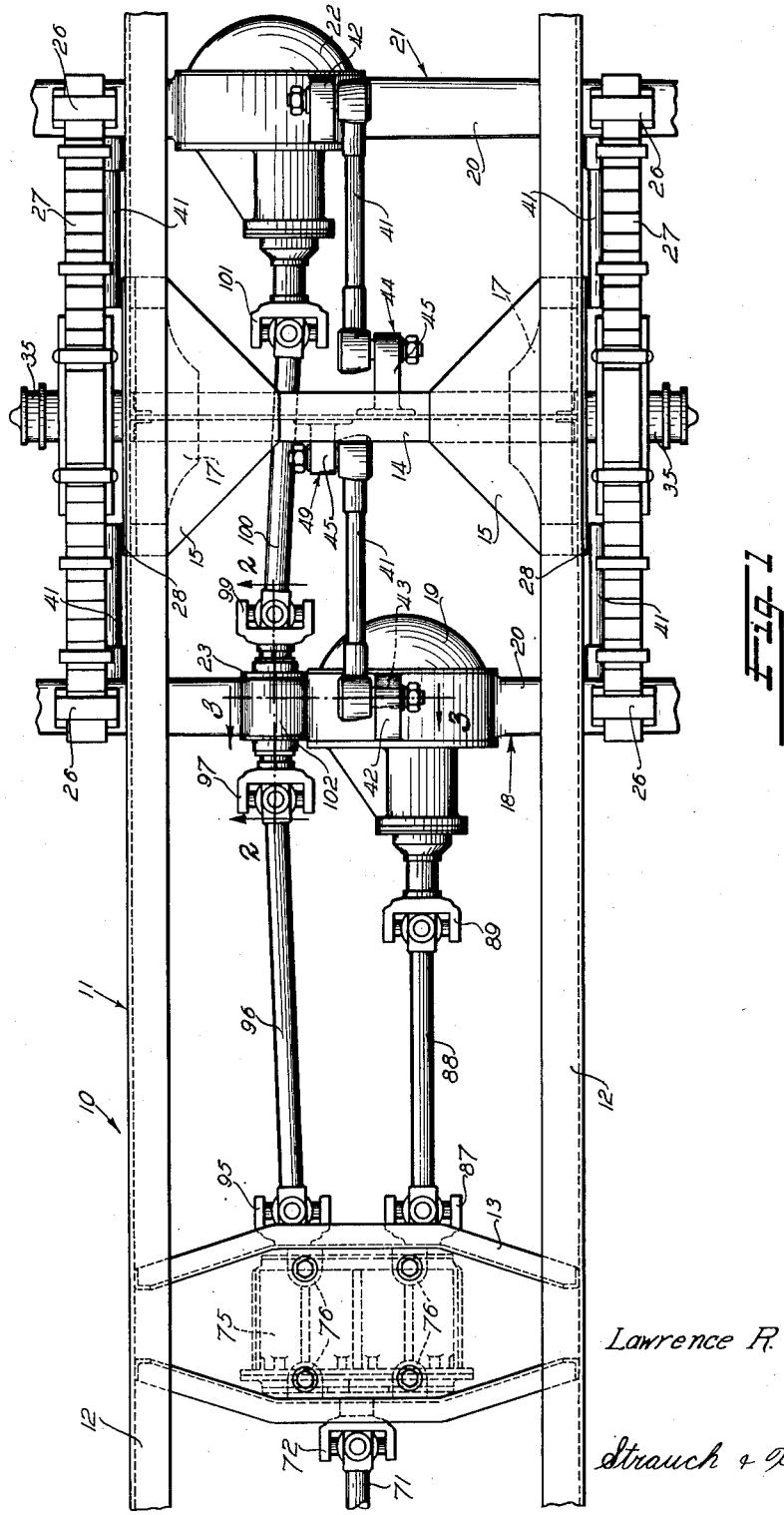
Figure 1 is a fragmentary plan view of a multi-wheel drive vehicle including the novel axle construction propeller shaft of the present invention.

With continued reference to the drawings, wherein like numerals are utilized throughout the several figures to indicate the same parts, numeral 10 indicates generally a multi-wheel vehicle structure embodying the novel features of the present invention.

Multi-wheel vehicle structure 10 includes a frame 11 comprising spaced longitudinal U-beams 12 running from end to end of the vehicle. Frame members 12 may be connected by conventional cross members in the usual manner, such members not being shown in the present drawings. A suitable cross plate 13 is shown at the forward end of frame 11, for taking the place of one of the conventional cross members, but primarily for a purpose that will be hereinafter pointed out.

Adjacent the rear end of frame 11 a transverse I-beam 14 is secured in place between longitudinal members 12 by means of plates 15 and 17 which are preferably riveted to members 12 and to I-beam 14. The purpose of this I-beam in addition to its incidental reinforcing of frame 11 will be pointed out as the description proceeds.

Frame member 11 is supported on suitable dirigible wheels (not shown) at its extreme forward end. The opposite end is supported by a forward drive axle 18 comprising a differential housing 19 and an axle housing 20 containing an axle shaft 20', and by a rear drive axle 21 including a differential housing 22 and an axle housing 20. Forward axle housing 20 is provided with a journal 23 the purpose of which will be hereinafter pointed out. Suitable drive wheels (not shown) support the ends of axles 18 and 21. Axle housings 20 adjacent their ends are provided with suitable spring seats 26; and suitable springs, such as leaf springs 27, are adapted to rest in said spring seats 26.

Springs 27 are journaled at their mid-points to frame members 12 by means of assemblies including brackets 28, connected to frame members 12 by means of rivets, and trunnions 35.

Means are provided for maintaining the axles 18 and 21 in definite spaced relation since the springs 27 merely rest upon axle seats 26 and are not connected thereto. To this end, suitable radius rods 41 are provided. Radius rods 41 are of equal length and identical construction.

Referring to Figure 1, a pair of rods 41 are centrally disposed and pivotally connected at one end to the top of axles 18 and 21 through lugs 42 integrally formed on axle housings 20. The connections at 42 are preferably formed by means of tapered pivot pins 43 that are secured to the lugs and that project into enlargements or sockets on the ends of radius rods 41. The opposite ends of these rods 41 are similarly pivoted at 44 to I-beam 14 which is provided with suitable brackets 45, the rear one being slightly longer than the forward one. The bottom ends of axles 18 and 21 are pivotally connected to further rods 41, serving as torque rods, the opposite ends of which are pivotally connected to the lower part of bracket members 28.

As the details of construction of the spring suspension and axle spacing means form no part of the present invention, being claimed in my aforementioned patent, they will not be further described.

The axles of the multi-wheel unit are supplied with power from a suitable change speed transmission, not shown. The drive from the change speed transmission is through a main propeller shaft 71 including a universal joint 72. From universal joint 72 the power from propeller shaft 71 is transmitted to a power divider 75. Propeller shafts 88 and 96 are connected by universal joints 87 and 95 to two output shafts, not shown, which are differentially driven by means of suitable differential gearing within the power divider 75. Power divider 75 is secured to cross plate 13 by means of connections 76. The interior construction of the power divider and the manner of mounting the same on plate 13 are disclosed and described in detail in my aforementioned patent.

A universal joint 97 connects shaft 96 to journal shaft 98, mounted in journal 23 provided on forward axle housing 20. Shaft 98 to the rear of journal 23 is provided with a universal joint 99 connecting shaft 98 and a short rear axle propeller shaft 100. A universal joint 101 connects shaft 100 to the differential in rear axle differential housing 22. Shaft 88 is connected to the differential in front differential housing 19 by a universal joint 89.

From the foregoing description it will be clear that the drive for axles 18 and 21 is transmitted from the change speed transmission to propeller shaft 71, through the power divider differential, and then to propeller shafts 88 and 96 driving them at differential speeds in well-known manner. Shafts 88 and 96 transmit power to the usual axle differentials in axles 18 and 21, respectively. In view of this construction the axle differentials may be driven at differential speeds and the wheels of the respective axles due to the axle differentials may also be driven at differential speeds.

The journal 23 and its associated mechanism, provided on forward axle 18, will now be described. The journal includes a boss 102 integrally formed on axle housing 20 and provided with spaced bearing seats 103 which preferably receive tapered roller bearings 104 (see Figures 2—3). Bearings 104 rotatably support shaft 98 in journal 23 and serve to take the radial load as well as the axial thrust imparted to shaft 98 during normal operation of the vehicle. Nuts 105 threaded on the ends of shaft 98 clamp the inner bearing races of bearings 104 between the shoulders provided by enlarged portion 106 of shaft 98 and the yokes of universal joints 97 and 99. Suitable shims 107 are provided for maintaining bearings 104 in spaced relation so that their outer races are properly positioned on seats 103 and also to adjust the clearances of these bearings.

A novel lubrication system is provided for the bearings 104. To this end the boss 102, between bearing seats 103, is disposed lower than the top of the axle differential and is of sufficient diameter to provide a relatively large oil reservoir 108 between shaft 98 and the interior of boss 102. A hole 109 is provided between reservoir 108 and the interior of differential housing 19. An inclined oil tube 110 is positioned with its lower end in the hole 109 and its upper end at a high point in the differential housing 19 adjacent the top of the ring gear of the latter. The upper end of the tube 110 is cut away to provide an open channel 110' for reception of lubricant. A suitable U-shaped bracket 111 adjustably secured within housing 19 by means of a nut and bolt assembly 112 (Figure 4) is preferably welded to the tube 110 adjacent cut-away portion 110'.

Differential housing 19 is supplied with lubricant to a sufficient depth to insure the dipping of differential bevel gear 113 therein. As a consequence gear 113 carries a film of the lubricant on its surface as it rotates, and since the channel 110' faces in a direction generally opposite to that of rotation of the adjacent gear portion the lubricant on the plain back face of gear 113, due to the rotation is thrown into and/or picked off by cut-away portion 110' of oil tube 110. Oil, thus deposited in tube 110, flows by gravity to oil reservoir 108 and thence to bearings 104 to properly lubricate them. The excess oil transmitted to oil reservoir 108 is returned to differential housing 19 through return ports 114 provided in the lower surface of reservoir 108 adjacent the outer ends of the bearings. To prevent the escape of lubricant into the atmosphere from bearings 104 suitable oil seals 115 are provided which surround the adjacent yokes of universal joints 97 and 99. Suitable covers 116 secured to boss 102 by cap screws 117 retain oil seals 115 in position. From the above description it will be seen that no external lubricant fitting need be provided for journal 23 or bearings 104.

If desired, the tube 110 may be eliminated and a passage 109a formed directly in housing 19, as shown in Figure 3. From this structure, it will be clear that opening 110a in passage 109a, which corresponds in character and position to opening 110', of tube 110, receives the lubricant thrown by gear 113 and conveys it to reservoir 108.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual drive axle assembly of the character described, a drive axle comprising an axle housing including a differential bowl having a quantity of lubricant therein and a journal rotatably supporting a section of a propeller shaft assembly for driving the other axle; a differential unit including a gear having a face dipping into the lubricant contained in said differential housing; a lubricant reservoir in said journal; and a lubricant supply passage having a trough-like receiving end disposed in said differential housing closely adjacent said gear face and an open discharge end communicating with said reservoir so that the lubricant picked off said gear face by said receiving end of the passage is conveyed to said reservoir for lubricating said journal.

2. An axle comprising a housing portion, a hollow open-ended boss integral with said housing portion and extending transversely thereof, spaced bearing seats in opposite ends of said boss, anti-friction bearing means having outer race members engaging said seats, a shaft extending through said boss and mounted in the inner races of said bearing means, means on said shaft providing spaced shoulders for engaging the inwardly facing sides of said inner races, coupling members mounted on the outer ends of said shaft, lubricant sealing assemblies between said couplings and the adjacent ends of said boss and means clamping said coupling members against the outer sides of said inner races, whereby said inner races are held firmly against said shoulders and said shaft supported against axial thrusts.

3. In a vehicle drive assembly having a pair of longitudinally spaced drive axles each comprising an axle housing formed with a gear chamber containing a supply of lubricant and having a propeller shaft assembly connected to drive one of said axles, a journal on the housing of the other of said axles rotatably supporting an intermediate section of said propeller shaft assembly, said journal enclosing a lubricant receiving space separate from the gear chamber of said other axle, and means including a passage between said gear chamber on said other axle and said journal for conducting lubricant from said chamber to said lubricant receiving space for lubricating the journal.

4. In the vehicle drive assembly defined in claim 3, said journal comprising an integral open-ended formation on its associated axle housing, spaced bearings in said formation carrying said intermediate propeller shaft assembly section, and lubricant sealing means surrounding said propeller shaft assembly section at the open ends of said formation.

5. In a vehicle drive assembly having a pair of spaced drive axles each comprising an axle housing formed with a gear chamber containing a supply of lubricant, a journal on one of said housings, a rigid shaft rotatably supported in said journal and having its opposite ends protruding therefrom, a lubricant reservoir within said journal separate and distinct from said gear chamber, a motor driven shaft connected to one end of said rigid shaft, a universal joint at the other end of said rigid shaft, a propeller shaft interconnecting said universal joint and the other drive axle, a lubricant conducting passage on said one axle housing leading from its gear chamber to said reservoir, and lubricant sealing means surrounding said rigid shaft where it protrudes from said journal.

6. A drive axle sub-assembly adapted for incorporation in a multi-wheel drive axle assembly wherein longitudinally spaced drive axles are separately driven by independent propeller shafts comprising an axle housing embodying a differential gear chamber containing a driven gear having a face dipping into a supply of lubricant in said chamber, a journal on said housing having a lubricant reservoir therein separate and distinct from said gear chamber and adapted to support a rotatable section of a propeller shaft driving one of the other axles of said assembly, and a lubricant supply passage within said housing having a receiving end disposed closely adjacent said gear face and shaped to collect lubricant therefrom and a discharge end leading to said reservoir.

7. In the drive axle assembly defined in claim 6, said lubricant supply passage comprising a tubular member extending from a point closely adjacent said gear face to an aperture in the wall of said reservoir.

8. In the drive axle assembly defined in claim 6, said lubricant supply passage comprising a tubular member having one end supported closely adjacent said gear face and said member being cut away at said one end to provide a trough-shaped lubricant collecting portion.

9. In the drive axle assembly defined in claim 6, said lubricant supply passage being formed in the walls of said housing.

10. In a drive axle assembly comprising an axle housing and a differential gear chamber containing a driven gear having a face dipping into a supply of lubricant in said chamber, an open-ended hollow boss on said housing separate from said chamber, spaced bearings fitted into seats at the open ends of said boss, a shaft rotatably supported by said bearings, said seats being designed to resist axial thrusts on said shaft and serving to space said bearings along said shaft with the annular space between said bearings and boss defining a lubricant reservoir about said shaft, lubricant sealing means surrounding said shaft where it protrudes through said bearings, a lubricant supply passage having its receiving end disposed to collect lubricant from said gear face and its discharge end at said reservoir, and passage means returning excess lubricant from said boss to said chamber.

11. A drive axle sub-assembly adapted for incorporation in a multi-wheel drive axle assembly wherein longitudinally spaced drive axles are separately driven by independent propeller shafts comprising, an axle housing containing live axle drive mechanism and embodying a gear chamber provided with a supply of lubricant, a journal on said housing enclosing a lubricant receiving space separate and distinct from said gear chamber and adapted to support a rotatable section of a propeller shaft driving one of the other axles of said assembly, means including a passage between said gear chamber and said lubricant receiving space for leading lubricant to said lubricant receiving space for lubricating said shaft.

LAWRENCE R. BUCKENDALE.